T. ZIMMERMAN.
BRAKE MECHANISM.
APPLICATION FILED JUNE 19, 1919.
1,438,569.
Patented Dec. 12, 1922.
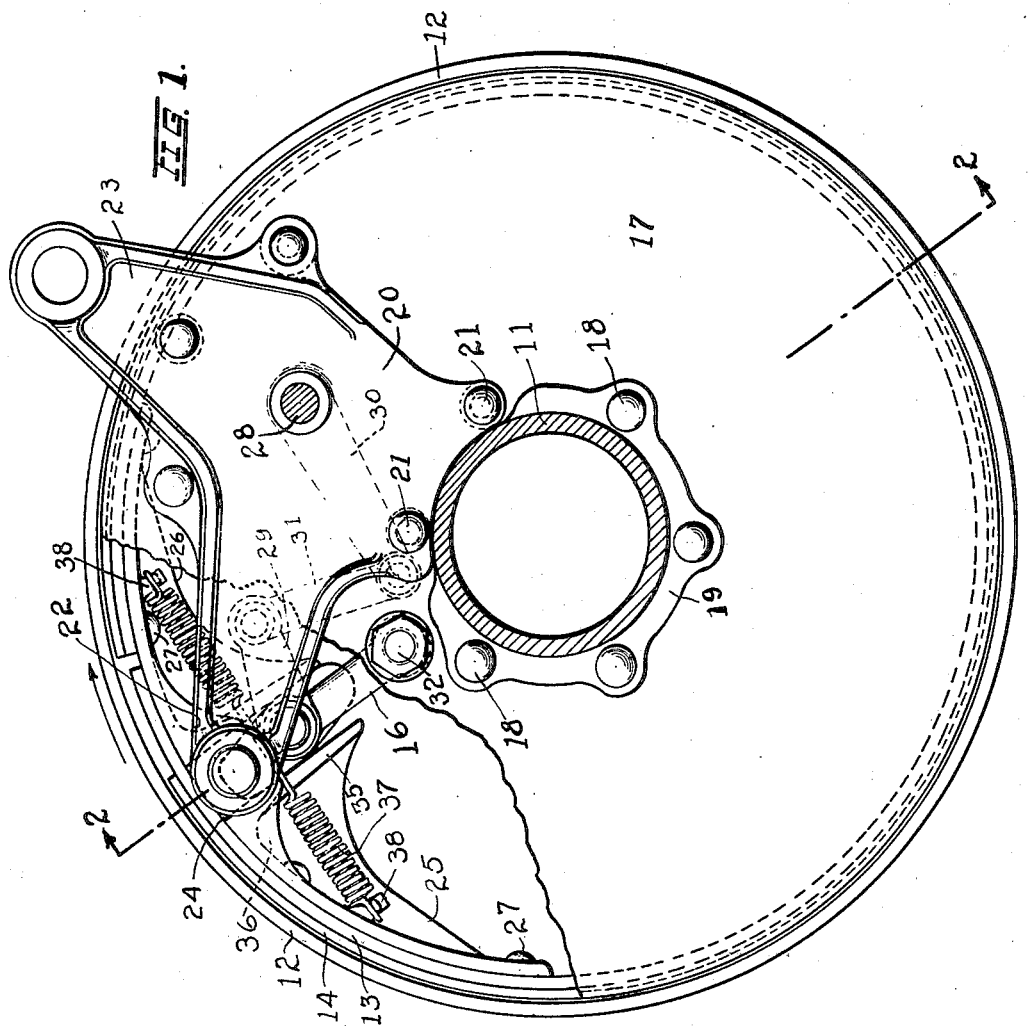
Inventor
THOMAS ZIMMERMAN.
Attorney Patented Dec. 12, 1922.

1,438,569

UNITED STATES PATENT OFFICE.

THOMAS ZIMMERMAN, OF CLEVELAND, OHIO, ASSIGNOR TO THE STANDARD PARTS COMPANY, OF CLEVELAND, OHIO, A CORPORATION OF OHIO.

BRAKE MECHANISM.

Application filed June 19, 1919. Serial No. 305,374.

*To all whom it may concern:*

Be it known that I, THOMAS ZIMMERMAN, a citizen of the United States, and a resident of Cleveland, county of Cuyahoga, State of Ohio, have invented certain new and useful Improvements in Brake Mechanism, of which the following is a specification.

This invention relates to brake mechanism for vehicle wheels and more particularly to means for supporting the brake applying mechanism.

One of the objects of the invention is to provide means for supporting the brake to engage it with a brake drum which will be movable with the brake as it rotates with the brake drum. Another object of the invention is to provide expanding means which will, at any stage of its operation, exert equal pressure upon the ends of the brake, and a still further object is to provide means for anchoring the brake from rotation, which will cooperate with surfaces at the ends of the brake, but will not interfere with the motion of the brake expanding means.

Other objects and the features of novelty will be apparent from the following description, taken in connection with the accompanying drawing, in which:—

Figure 1 is a side elevation of a brake structure embodying my invention, certain parts being shown in section and the brake supporting anchor disc being broken away to more clearly show the brake operating mechanism; and Figure 2 is a fragmentary section of the structure shown in Figure 1 on the line 2—2 of Figure 1.

In the drawings, 11 indicates the axle housing of a motor vehicle which is adapted to support a motor vehicle wheel (not shown), the brake drum 12 being carried by the wheel and adapted to rotate therewith relatively to the axle housing 11. A brake band 13, provided with the usual lining 14, is positioned within the brake drum 12 and adapted to be engaged with the inner surface thereof. A cam 15, adapted to be rotated to separate the ends of the brake 13 and engage it with the drum, is carried by the link 16 which is pivotally mounted on the brake supporting structure, so as to permit a limited circumferential movement of the cam 15 when the brake is applied.

As shown in the drawings, the brake band 13 is of the "full-wrap" type and consists of a flexible member which is adapted to be expanded so that the brake lining 14 mounted thereon will engage with the brake drum 12. An anchor disc 17 is secured by rivets 18, or any other suitable means, to a flange 19 which extends radially from the axle housing 11, and is provided with an anchor plate 20, secured thereto by rivets 21. The anchor plate 20 is formed with supporting arms 22 and 23 adapted, respectively, to anchor the internal and external brakes, the structure of the external brake and its operating mechanism being neither shown nor described herein, as it constitutes no part of the present invention. A brake anchor stud 24 is carried by the arm 22 and extends within the brake drum 12 between end members 25 and 26, which are rigidly secured to the ends of the brake band 13 by rivets 27. The cam 15 is also positioned between the end members 25 and 26 of the brake band and is adapted to be rotated by the operating shaft 28 through the lever arms 29 and 30 on the cam and operating shaft, respectively, and the link 31 which connects these lever arms. The cam 15 is carried by the link 16 which is pivoted on a stud 32 which extends inwardly from the anchor disc 17 and is held in place thereon by the nut 33, the cam 15 being movable with the link 16 about the stud 32, as the brake band rotates with the drum.

The cam 15 extends radially in opposite directions from its pintle 34 which is journaled in the outer end of the link 16, the cam being integral with the pintle, or rigidly secured thereon, as desired, and the lever arm 29 is keyed, or otherwise secured to the pintle 34. As shown in Fig. 1, the end members 25 and 26 are formed with web portions 35 adapted to be engaged by the cam 15, and similar web portions 36 of greatly reduced extent, adapted to engage with the anchor stud 24, the web portions 35 and 36 being so formed that the link 16 and operating lever 29 are free to move without contacting with the anchor stud 24 or the end members 25 and 26, while surfaces are provided on the webs 35 of sufficient extent to properly cooperate with the cam 15. A helical spring 37 it attached at its end to lugs 38 on the end members 25 and 26 to normally hold the brake in retracted position, the end members 25 and 26 being held in engagement with the anchor stud 24.

In operating the brake the shaft 28 will be rotated in the usual manner and this will rock the arm 29 and thus expand the brake within the drum 12. As soon as the brake engages with the drum the two will rotate together slightly until one end of the brake engages with the anchor stud 24 which will stop the rotation of the brake and thus serve to retard the drum. Reverse rotation of the shaft 28 will permit the spring 37 to withdraw the brake from the drum.

If the drum is moving in the direction of the arrow in Fig. 1 and the cam 15 is rotated to engage the brake with the drum, both of the end members 25 and 26 will be moved slightly away from the anchor stud 24. So soon as the brake engages the drum, it will move circumferentially therewith, the end members 25 and 26 and the cam 15 moving as a unit with the brake 13 until the end member 25 again engages the anchor stud 24. The thrust of the end member 25 will then be taken by the anchor stud 24, while the end member 26 will continue to move with the brake drum until the brake 13 is fully expanded against the interior of the drum. The cam 15 can be further rotated by the operating mechanism to follow up the brake end member 26 to hold the movable end of the brake against the drum and, by added pressure, to increase the braking effect. Since the end member 25 is held firmly against the anchor stud 24, the cam 15 will swing about the stud 32 and will exert equal pressure against the end members 25 and 26, so that it will be unnecessary for the operator to overcome the thrust of the end member 25 against one arm of the cam 15, in order to hold the brake in applied position or exert additional pressure on the end member 26, to increase the braking effect, as would be the case if the cam 15 were rigidly mounted relatively to the anchor stud 24. It will be understood that similar results will be obtained if the brake drum is rotating in the opposite direction, in which case the end member 26 will be held against the anchor stud 24 and the cam 15 will swing about the stud 32 to maintain engagement with the end member 25 to hold the brake in expanded position.

While I have shown and described a preferred structure, embodying my invention, it will be understood that changes may be made in the details and construction of the parts, without departing from the spirit of the invention which is defined in the appended claims.

Having thus described my invention, what I claim is:

1. In brake mechanism, the combination of a brake drum, a brake, means normally holding said brake out of engagement with said drum, a rotatable cam member for engaging said brake with said drum, a member pivotally supporting said cam member and movable therewith circumferentially with the brake, and means for rotating said cam member.

2. In brake mechanism, the combination of a brake drum, a brake, means normally holding said brake out of engagement with said drum, a pivotally supported member, a cam member carried thereby, and means for rotating said cam member to engage said brake with said drum, comprising a lever arm rigid with said cam member and a link pivotally connected thereto, said cam member and said lever arm being movable with said brake when the brake moves circumferentially with the drum.

3. In brake mechanism, the combination of a brake drum, a brake, means normally holding said brake out of engagement with said drum, anchoring means cooperating with the brake to limit the circumferential movement thereof, a cam member between the ends of the brake and movable circumferentially therewith, a pivotally mounted member in which said cam member is supported extending substantially radially of the drum, and means for rotating said cam member to engage said brake with said drum, comprising a lever arm rigid with the cam member and a link pivotally connected thereto and extending substantially radially of the drum.

4. In brake mechanism, the combination of a brake drum, a brake, means normally holding said brake out of engagement with said drum, anchoring means to limit the circumferential movement of the brake, a cam member adapted to engage said brake with said drum, means for actuating said cam member, comprising a lever arm rigid with the cam member, an operating shaft carried by said anchoring means, a lever arm rigid with said operating shaft, and a link connecting said lever arms, and means cooperating with said anchoring means for holding said cam member from movement radially of the drum but permitting movement circumferentially with the brake.

5. In brake mechanism, the combination of a brake drum, a brake, means normally holding said brake out of engagement with said drum, anchoring means to limit the circumferential movement of the brake, a cam member adapted to engage asid brake with said drum, a supporting member carrying said cam member at one end thereof, and having its other end pivotally connected to said anchoring means, and means for rotating said cam member, comprising a lever arm rigid with the cam member, an operating shaft carried by said anchoring means, a lever arm rigid with said operating shaft, and a link connecting said lever arms.

6. In brake mechanism, the combination of a brake drum, a brake, means normally holding said brake out of engagement with said drum, anchoring means cooperating with the brake to limit the circumferential movement thereof, a supporting member pivotally carried by said anchoring means, a cam member carried by said supporting member and movable relatively thereto to engage said brake with said drum, and means for actuating said cam member.

In testimony whereof I affix my signature.

THOMAS ZIMMERMAN.